Aug. 22, 1961 D. R. BARKMAN 2,997,020
MONITOR JAR FOR AUTOMATIC MILKING SYSTEM
Filed March 3, 1959
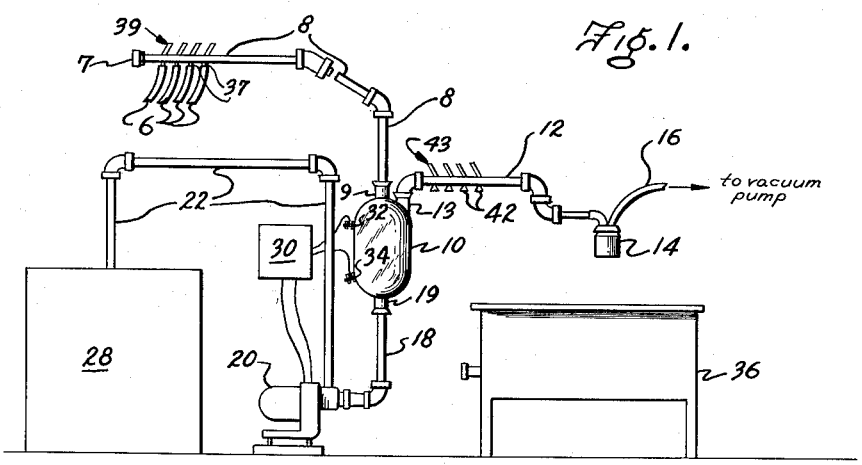
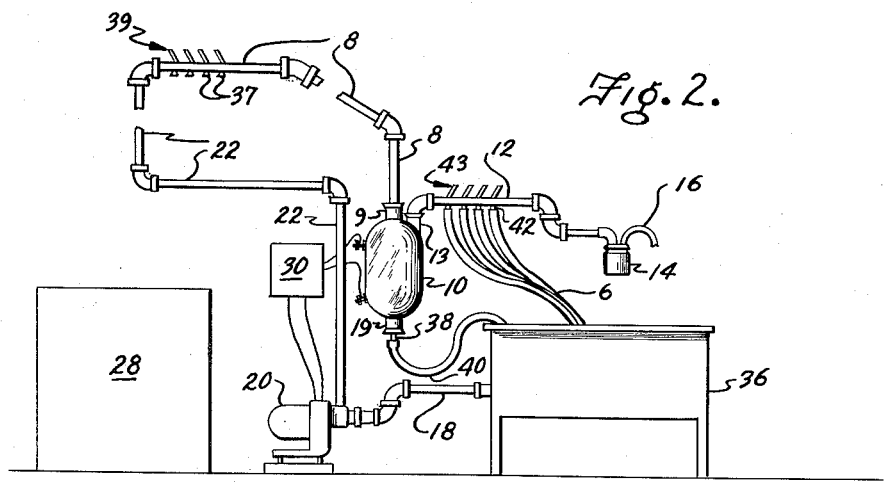
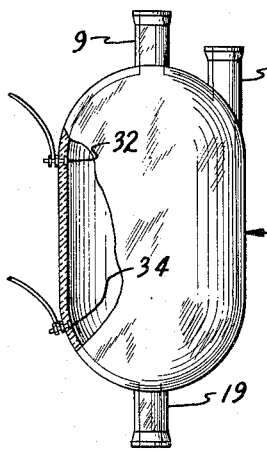
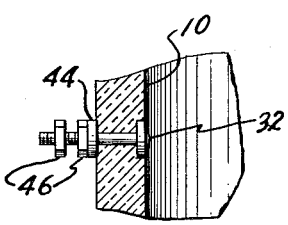
INVENTOR
DAVID R. BARKMAN
BY Chapin & Neal
ATTORNEYS

United States Patent Office 2,997,020
Patented Aug. 22, 1961

2,997,020
MONITOR JAR FOR AUTOMATIC MILKING SYSTEM
David R. Barkman, Longmeadow, Mass., assignor to Rite-Way Dairy Farm Equipment Corporation, Springfield, Mass., a corporation of Delaware
Filed Mar. 3, 1959, Ser. No. 796,849
1 Claim. (Cl. 119—14.18)

This invention relates to an automatic milking system and in particular to improved monitor jars for controlling the operation of a milk transfer pump in the system.

Some of the currently available milking systems utilize a monitor jar or flask for controlling the operation of a transfer pump. Milk is drawn by a vacuum source from a cow into the jar and a pump transfers the milk from the jar into a bulk tank for further processing. The transfer pump is driven only when the jar contains a sufficient quantity of milk to provide an adequate head of pressure for the pump. Electrical probes positioned within the monitor jar sense the level of milk in the jar and in conjunction with a liquid level control unit control the operation of an electric motor which drives the pump. In this way the monitor jar and control unit prevent operation of the pump on an insufficient head or pressure and consequent churning of the milk.

Compliance with the milk sanitary code requires frequent and thorough cleaning of the entire milking system and with the systems now available this necessitates disassembly of the system and removal of the electric probes.

The principal object of this invention is to provide an improved monitor jar of such constructional characteristics that the entire milking system including the jar may be thoroughly washed and cleaned while the jar is in operative position in the system and without disassembly.

The above and other objects and advantages of this invention will be made more apparent from the following description and with reference to the drawing.

In the drawing:
FIG. 1 is a diagrammatical showing of a milking system embodying the present invention connected for milking operation;

FIG. 2 is a diagrammatical showing of the system of FIG. 1 connected for a washing operation;

FIG. 3 is an enlarged view of a monitor jar embodying this invention, shown also in operative position in FIGS. 1 and 2; and FIG. 4 is an enlarged view of one of the contacts of FIG. 3.

Referring now in detail to the drawing, FIG. 1 shows a milking system set up for a milking operation. Tubes 6 which extend from a teat cup unit (not shown) are connected to tubing 8 which extends from the barn or milking location to a tubulation 9 in the top of the monitor jar 10. Tubing 12 extends from a tubulation 13 on the top of the jar through moisture trap 14 to a vacuum line 16. The vacuum line is adapted to be connected to a vacuum pump. A tube or pipe 18 extends downwardly from a tubulation 19 in the bottom of the jar 10 to an electric motor driven pump 20. The discharge side of the pump 20 is connected by pipes or tubing 22 to a bulk tank 28. A control unit 30 is electrically connected to the motor 20 and to a pair of contacts 32 and 34 (FIG. 3) which extends sealingly through wall portions of the jar 10.

During a milking operation a vacuum is created in this system by a vacuum pump (not shown) connected to the line 16. Milk extracted from a cow is drawn through the tubing 8, closed off at its outer end 7, into the jar 10 and downwardly through the tube 18 to the pump 20.

The milk level rises in the jar 10 and when it reaches the level of the contact 32 an electric circuit is completed by the milk between the contacts 32 and 34 actuating a relay in the unit 30. The control unit starts the motor of the pump 20 which transfers the milk from the jar 10 into the bulk tank. The pump 20 will continue to operate until the level of the milk in the jar recedes to a level below the contact 34. When this conditions occurs, the motor of the pump 20 is stopped by the control unit 30. The unit 30 is a standard type of electronic liquid level control such as marketed by Machinery Electrification Inc. The control unit 30 and the contacts 32 and 34 insure a proper head of pressure on the pump and prevent churning of the milk in the tubing of the system as would be the case if the pump were operated with an insufficient head of pressure.

This system may be readily changed over for cleaning and flushing by disconnecting the pipe 18 from the jar 10 and connecting it to a wash tank 36. The tubing 22 is removed from the bulk tank 28 and connected to the tubing 8 forming a loop from the pump 20 to the jar 10. Fittings 37 of the tubing 8 are closed by valve members controlled by handles 39. An end cap 38 is fitted to the bottom opening of the jar 10 and includes a small diameter tube. A rubber tube 40 is connected to the tube of the cap 38 and its free end is positioned in the wash tank 36. The free ends of tubes 6 are connected to fittings 42 of the pipe 12, the valves of these fittings being opened by handles 43 and the teat cup unit is placed in the wash tank 36.

The operation of this system during a wash cycle will now be described with reference to FIG. 2. The control unit 30 is rendered inoperative and the pump 20 is driven constantly during the washing operation. The pump 20 draws cleaning water from the tank 36 through the tube 18 and pumps it through the loop formed by tubing 22 and 8 of the system and into the jar 10. A portion of this water is drained from the bottom of the jar 10 by the rubber tube 40. The use of the tube 40 insures that the interior of the tubulation 19 will be washed by the water flowing from the jar 10 into the tube 40. Sufficient water is pumped by the pump 20 to fill the jar 10 at a rate faster than it is drained by tube 40 and the excess water surges within the jar and passes through the tubulation 13 to the pipe 12, the tubes 6 of the teat cup unit, and the vacuum line 16. This washing operation is continued until all the tubing and the jar 10 are completely and thoroughly cleaned.

The monitor jar 10 is shown on an enlarged scale in FIG. 3. The jar is fabricated of a glass which is highly heat resistant such as Pyrex, marketed by Corning Glass Works. The body of the jar includes a cylindrical central portion and spherically curved end portions. The inner surface of the jar is smooth throughout and does not have any sharp edges or corners into which a milk residue or film can become lodged. The jar includes 3 tubulations formed integral with the spherical end portions thereof. The tubulations 9 and 19 are located on the center line of the jar at the top or bottom respectively, and the tubulation 13 is offset radially from the center of the jar. The tubulations are adapted to be connected to piping or tubing of the milking system as described above.

The contacts 32 and 34 of the monitor jar are sealed in vertically spaced wall portions of the jar, the contacts being so disposed during the formation of the jar. The contacts are made of a corrosion resistant metal such as tungsten. The contacts include head portions, the inner surfaces of which are flush with the smooth inner surface of the jar. The contacts also include stem portions which extend outwardly of the jar and are adapted to be electrically connected to the electronic level control unit 30. The stem portions of the contacts are threaded and provided with non-metallic washer 44 and a pair of nuts 46 between which an electrical lead is clamped.

During the washing cycle of this milking system, described above, cleaning water is drawn from the tank 36 and circulated by the pump 20 throughout the system. This cleaning water circulates within the jar 10 and simultaneously cleans the smooth inner surface of the jar and the inner surfaces of the contacts 32 and 34. This monitor jar and its electrical contacts may therefore be thoroughly and simultaneously cleaned in accordance with the requirements of the milk sanitation code while the jar is in operative position in the milking system, and without necessitating even partial disassembly of the jar as has heretofore been required.

Having thus described this invention, what is claimed is:

A monitor jar for use in vacuum operated milking systems having milking and washing cycles, said jar being of glass construction comprising a body portion defining a wholly enclosed chamber and tubulations communicating with the interior of said chamber and extending integrally from said body portion, and electrical liquid level sensing contacts embedded in the glass forming said jar and sealingly extending through vertically spaced wall portions thereof, the ends of said contacts within said jar being disposed flush with the inner surface of said jar to enable thorough washing of both the interior of the jar and said contacts with the jar in operative position in said system, said contacts including portions extending outwardly of said jar for connection with an electric level control unit.

References Cited in the file of this patent

UNITED STATES PATENTS

| | | |
|---|---|---|
| 2,725,850 | Makous | Dec. 6, 1955 |
| 2,791,964 | Reeve | May 14, 1957 |
| 2,859,760 | Borell | Nov. 11, 1958 |
| 2,878,819 | Thomas | Mar. 24, 1959 |